United States Patent
Hwang et al.

(10) Patent No.: US 12,479,970 B2
(45) Date of Patent: Nov. 25, 2025

(54) METHOD FOR PREPARING POLY (BUTYLENE ADIPATE-CO-TEREPHTHALATE)-CARBON NANOTUBE COMPLEX

(71) Applicant: LG CHEM, LTD., Seoul (KR)

(72) Inventors: Sung Hoon Hwang, Daejeon (KR); Jae Hyeong Park, Daejeon (KR); Jeongmin Lee, Daejeon (KR); Seungtaek Oh, Daejeon (KR)

(73) Assignee: LG CHEM, LTD., Seoul (KR)

( * ) Notice: Subject to any disclaimer, the term of this patent is extended or adjusted under 35 U.S.C. 154(b) by 634 days.

(21) Appl. No.: 17/800,423

(22) PCT Filed: Oct. 18, 2021

(86) PCT No.: PCT/KR2021/014501
§ 371 (c)(1),
(2) Date: Aug. 17, 2022

(87) PCT Pub. No.: WO2022/092660
PCT Pub. Date: May 5, 2022

(65) Prior Publication Data
US 2023/0102568 A1 Mar. 30, 2023

(30) Foreign Application Priority Data
Oct. 26, 2020 (KR) .................. 10-2020-0139669

(51) Int. Cl.
*C08K 3/04* (2006.01)
*C08G 63/183* (2006.01)

(52) U.S. Cl.
CPC ............ *C08K 3/041* (2017.05); *C08G 63/183* (2013.01); *C08K 2201/001* (2013.01)

(58) Field of Classification Search
CPC ........................................... C08J 3/14
See application file for complete search history.

(56) References Cited

U.S. PATENT DOCUMENTS

| | | |
|---|---|---|
| 7,943,065 B2 | 5/2011 | El Bounia |
| 10,400,074 B2 | 9/2019 | Singh et al. |
| 2021/0079211 A1 | 3/2021 | Mohanty et al. |

FOREIGN PATENT DOCUMENTS

| | | |
|---|---|---|
| CN | 103881336 A | 6/2014 |
| CN | 108034200 A | 5/2018 |
| CN | 209602446 U | 11/2019 |
| CN | 106832815 B | 4/2020 |
| JP | 2009534509 | 9/2009 |
| JP | 2011068773 | 4/2011 |
| JP | 2012097133 | 5/2012 |
| KR | 10-2010-0076742 A | 7/2010 |
| KR | 10-2010-0086854 A | 8/2010 |
| KR | 10-2010-0107200 A | 10/2010 |
| KR | 10-2011-0066751 A | 6/2011 |
| KR | 10-2014-0044617 A | 4/2014 |
| KR | 10-1471577 B1 | 12/2014 |
| KR | 10-1802235 B1 | 12/2017 |
| WO | 2003007314 A1 | 1/2003 |
| WO | 2019-113713 A1 | 6/2019 |

OTHER PUBLICATIONS

Da Silva, et al., "Double Percolation of Melt-Mixed PS/PBAT Blends Loaded With Carbon Nanotube: Effect of Molding Temperature and the Non-Covalent Functionalization of the Filler By Iconic Liquid", Frontiers in Materials, vol. 6, article 191, Aug. 7, 2019, pp. 1-11.

Gao et al.; "ADIPIC Acid Terephthalic Ternary Polyester Oxide Composite Material Obtain Disperse"; Abstract, CN10388136; Database WPI Week 201457, Thomson Scientific, London, GB.

Ren et al., Biodegradable graphene oxide nanosheets/poly-(butylene adipate-co-terephthalate) nanocomposite film with enhanced gas and water vapor barrier properties, Polymer Testing, vol. 58, Dec. 23, 2016, pp. 173-180.

*Primary Examiner* — Wenwen Cai

(74) *Attorney, Agent, or Firm* — BRYAN CAVE LEIGHTON PAISNER LLP

(57) ABSTRACT

The method for preparing poly(butylene adipate-co-terephthalate)-carbon nanotube complex of the invention can uniformly disperse carbon nanotubes in poly(butylene adipate-co-terephthalate), thereby lowering electric resistance and improving mechanical properties.

9 Claims, No Drawings

METHOD FOR PREPARING POLY(BUTYLENE ADIPATE-CO-TEREPHTHALATE)-CARBON NANOTUBE COMPLEX

The present application is a National Phase entry pursuant to 35 U.S.C. 371 of PCT/KR2021/014501 filed Oct. 18, 2021, and claims priority to and the benefit of Korean Patent Application No. 10-2020-0139669 filed on Oct. 26, 2020 with the Korean Intellectual Property Office, the disclosures of which are herein incorporated by reference in their entirety.

FIELD

This invention relates to a method for preparing a poly(butylene adipate-co-terephthalate)-carbon nanotube complex wherein carbon nanotubes are uniformly dispersed in poly(butylene adipate-co-terephthalate).

BACKGROUND

Poly(butylene adipate-co-terephthalate) is a biodegradable resin, and is used as a raw material for soft packaging materials, artificial films, and the like. It is similar to an insulator, and thus, the application range is limited in electronics industry applications requiring electrical conductivity.

In order to endow electrical conductivity to poly(butylene adipate-co-terephthalate), a method of dispersing conductive inorganic material, for example, particles such as copper powder, carbon black, and the like in poly(butylene adipate-co-terephthalate) is known. Among them, carbon nanotubes may endow high electrical conductivity even in a small amount compared to other conductive inorganic materials, and thus, there have been attempts to disperse carbon nanotubes in poly(butylene adipate-co-terephthalate).

However, due to Van Der Waals' force between carbon nanotubes, carbon nanotubes tend to agglomerate with, and due to high viscosity of poly(butylene adipate-co-terephthalate), if carbon nanotubes are dispersed in poly(butylene adipate-co-terephthalate), agglomeration of carbon nanotubes is generated, and thus, endowment of electrical conductivity to poly(butylene adipate-co-terephthalate) is limited.

SUMMARY

It is an object of the invention to provide a method for preparing a poly(butylene adipate-co-terephthalate)-carbon nanotube complex wherein carbon nanotubes are uniformly dispersed in poly(butylene adipate-co-terephthalate).

It is another object of the invention to provide a poly(butylene adipate-co-terephthalate)-carbon nanotube complex prepared according to the preparation method.

In order to achieve these objects, there is provided a method for preparing poly(butylene adipate-co-terephthalate)-carbon nanotube complex, comprising steps of:
1) adding poly(butylene adipate-co-terephthalate) and carbon nanotubes to chloroform and mixing them;
2) adding acetone to the mixture of step 1 and mixing them; and
3) recovering a precipitate from the product of step 2.

In this invention, instead of melt mixing of poly(butylene adipate-co-terephthalate) and carbon nanotubes, by using a solvent-based mixing method as described later, carbon nanotubes can be effectively dispersed in poly(butylene adipate-co-terephthalate), and thereby, electric resistance can be lowered and mechanical properties can be improved.

DETAILED DESCRIPTION

Hereinafter, the invention will be explained in detail according to each step.

(Step 1)

Step of 1 of the invention is a step wherein poly(butylene adipate-co-terephthalate) and carbon nanotubes are added to a chloroform solvent and mixed.

Chloroform is a solvent capable of dissolving poly(butylene adipate-co-terephthalate), and by dissolving poly(butylene adipate-co-terephthalate) in chloroform, dispersion of carbon nanotubes is further facilitated, compared to the addition of carbon nanotubes to molten poly(butylene adipate-co-terephthalate) in the prior art.

Particularly, poly(butylene adipate-co-terephthalate) has high viscosity in the molten state, and thus, it is difficult to disperse carbon nanotubes, but in the present disclosure, carbon nanotubes are dispersed to a solution in which poly(butylene adipate-co-terephthalate) is dissolved, thus inducing uniform dispersion.

Preferably, the addition is conducted such that the concentration of poly(butylene adipate-co-terephthalate) may become 0.01 to 20 mg/mL. The concentration is based on the chloroform solvent, and if the concentration is less than 0.01 mg/mL, the concentration may be too low, and thus, the amount of chloroform used should be increased, and if the concentration is greater than 20 mg/mL, the viscosity of the solution may increase, or poly(butylene adipate-co-terephthalate) may not be completely dissolved.

More preferably, the concentration of the poly(butylene adipate-co-terephthalate) is 0.02 mg/mL or more, 0.03 mg/mL or more, or 0.04 mg/mL or more, and 15 mg/mL or less, 14 mg/mL or less, 13 mg/mL or less, or 12 mg/mL or less.

The carbon nanotubes are used in the present disclosure to endow electrical conductivity to poly(butylene adipate-co-terephthalate). Preferably, the carbon nanotubes are added in the content of 0.1 to 20 parts by weight, based on 100 parts by weight of the poly(butylene adipate-co-terephthalate). If the content is less than 0.1 parts by weight, the effect of endowing electrical conductivity may be insignificant, and if the content is greater than 20 parts by weight, other basic properties of poly(butylene adipate-co-terephthalate) including mechanical properties may be adversely affected.

More preferably, the carbon nanotubes are added in the content of 0.2 parts by weight or more, 0.3 parts by weight or more, 0.4 parts by weight or more, 0.5 parts by weight or more, or 0.6 parts by weight or more, and 19 parts by weight or less, 18 parts by weight or less, 17 parts by weight or less, 16 parts by weight or less, or 15 parts by weight or less, based on 100 parts by weight of the poly(butylene adipate-co-terephthalate).

Meanwhile, the carbon nanotubes are not specifically limited as long as they can endow electrical conductivity, and for example, single-walled carbon nanotubes (SWCNT), or multi-walled carbon nanotubes (MWCNT) may be mentioned, and multi-walled carbon nanotubes are preferable in terms of endowing electrical conductivity.

Meanwhile, it is preferable that the poly(butylene adipate-co-terephthalate) has weight average molecular weight of 100,000 to 150,000 (g/mol).

It is preferable that the mixing of step 1 is conducted for 1 to 48 hours.

The mixing is conducted so as to uniformly mix carbon nanotubes and poly(butylene adipate-co-terephthalate) included in chloroform, and consequently, uniformly disperse carbon nanotubes in poly(butylene adipate-co-terephthalate). If the mixing time is less than 1 hour, mixing may not be sufficiently achieved, and if the mixing time is greater than 48 hours, uniformity may not substantially increase.

More preferably, the mixing of step 1 is conducted for 5 hours or more, 6 hours or more, 7 hours or more, 8 hours or more, 9 hours or more, or 10 hours or more, and 44 hours or less, 40 hours or less, or 36 hours or less.

Meanwhile, step 1 may be conducted at 10° C. to 50° C., preferably at 20° C. to 30° C. Further, step 1 may be conducted under pressure of 0.5 to 1.5 atm, more preferably 0.8 to 1.2 atm.

(Step 2)

Step 2 of the invention is a step wherein acetone is added to the mixture of step 1 and mixed.

The acetone is used as an anti-solvent, and is added to the mixture of step 1 to induce precipitation of poly(butylene adipate-co-terephthalate) and carbon nanotubes. Wherein, poly(butylene adipate-co-terephthalate) and carbon nanotubes are precipitated while being uniformly mixed, and consequently, precipitation is achieved while carbon nanotubes are uniformly dispersed in poly(butylene adipate-co-terephthalate).

Preferably, the acetone is added at 1 to 30 vol %, based on the chloroform. If the amount of acetone added is less than 1 vol %, precipitation may not effectively occur, and if the amount of acetone added is greater than 30 vol %, precipitation effect may not substantially increase.

More preferably, the acetone is added at 2 vol % or more, 3 vol % or more, 4 vol % or more, or 5 vol % or more, and 30 vol % or less, 29 vol % or less, 28 vol % or less, 27 vol % or less, or 26 vol % or less, based on chloroform.

The mixing of step 2 may be conducted by stirring after adding the anti-solvent dropwise to the mixture of step 1, and it is preferable that the mixing is conducted for 1 minute to 1 hour after introducing the anti-solvent.

Meanwhile, step 2 may be conducted at 10° C. to 50° C., preferably at 20° C. to 30° C. Further, step 2 may be conducted under pressure of 0.5 to 1.5 atm, more preferably 0.8 to 1.2 atm.

(Step 3)

Step 3 of the invention is a step of recovering a precipitate from the product of step 2, wherein the precipitate comprises a poly(butylene adipate-co-terephthalate)-carbon nanotube complex to be prepared in the invention as a main component, and it is separated and recovered from the previously used solvent.

Preferably, in step 3, the product of step 2 is filtered and the precipitate is recovered. Further, in order to effectively remove the previously used solvent, the filtration is preferably vacuum filtration.

Further, if necessary, a step of drying the precipitate recovered in step 3 is further included. Since a solvent may be partially included in the recovered precipitate, the solvent is removed through drying. The conditions of the drying are not specifically limited as long as the solvent is evaporated and the properties of a poly(butylene adipate-co-terephthalate)-carbon nanotube complex are not affected.

(Poly(Butylene Adipate-Co-Terephthalate)-Carbon Nanotube Complex)

In the poly(butylene adipate-co-terephthalate)-carbon nanotube complex prepared according to the above explained method, carbon nanotubes are uniformly dispersed in poly(butylene adipate-co-terephthalate), and thereby, electrical conductivity is exhibited.

As described in Examples and Comparative Examples later, even if a poly(butylene adipate-co-terephthalate)-carbon nanotube complex is prepared using the same contents of poly(butylene adipate-co-terephthalate) and carbon nanotubes, compared to the existing melting method, when the complex is prepared according to the preparation method of the invention, electrical conductivity is remarkably improved.

Preferably, the electric resistance of the poly(butylene adipate-co-terephthalate)-carbon nanotube complex is 1,000 to 1,000,000Ω. The electric resistance can be measured using LCR meter of Agilent corporation, under voltage of 1V, by attaching copper tapes to both ends of a specimen prepared with hot-press and forming an electrode.

As described in Examples and Comparative Examples later, it can be confirmed that compared to the electric resistance of poly(butylene adipate-co-terephthalate) that does not include carbon nanotubes, electric resistance is remarkably lowered, and that compared to the case wherein the same amount of carbon nanotubes are melt mixed, electric resistance is remarkably lowered.

Further, the poly(butylene adipate-co-terephthalate)-carbon nanotube complex according to the invention also has excellent mechanical properties.

Preferably, the poly(butylene adipate-co-terephthalate)-carbon nanotube complex has tensile strength according to ASTM D638, of 10 MPa to 50 MPa.

Further, preferably, the poly(butylene adipate-co-terephthalate)-carbon nanotube complex has elongation at break according to ASTM D638, of 50% to 300%.

Further, preferably, the poly(butylene adipate-co-terephthalate)-carbon nanotube complex has shore D hardness according to ASTM D2240, of 10 to 50.

The above explained preparation method of a poly(butylene adipate-co-terephthalate)-carbon nanotube complex can uniformly disperse carbon nanotubes in poly(butylene adipate-co-terephthalate), thereby lowering electric resistance and improving mechanical properties.

Hereinafter, embodiments of the invention will be explained in more detail in the following examples. However, there examples are presented only as the illustrations of the embodiments of the invention, and the invention is not limited thereby.

EXAMPLES

Example 1

5 g of poly(butylene adipate-co-terephthalate)(BASF Ecoflex C1200) were added to 100 mL of chloroform, and stirred to dissolve. To the solution, 0.25 g of MWCNT (LG Chem., CP Grade) were added, and stirred and dispersed for 24 hours. Subsequently, while stirring the solution, 10 mL of acetone was added dropwise to induce precipitation. After the addition of acetone was completed, it was further mixed for 20 minutes to completely precipitate. From the precipitate, the solvent was removed by vacuum filtration, and the precipitate was dried in a vacuum oven for 24 hours to prepare a poly(butylene adipate-co-terephthalate)-carbon nanotube complex.

Example 2

A poly(butylene adipate-co-terephthalate)-carbon nanotube complex was prepared by the same method as Example 1, except that 0.75 g of MWCNT was used.

Comparative Example 1

The poly(butylene adipate-co-terephthalate)(BASF Ecoflex C1200) used in Example 1 was used as Comparative Example 1.

Comparative Example 2

5 g of poly(butylene adipate-co-terephthalate)(BASF Ecoflex C1200) were introduced in a glass, and heated to 160° C. under purging with nitrogen gas and molten. 0.25 g of MWCNT (LG Chem., CP Grade) were added thereto, and stirred for 5 hours while maintaining 160° C. Subsequently, the mixture was discharged on a Teflon film and cooled to prepare a poly(butylene adipate-co-terephthalate)-carbon nanotube complex.

Experimental Example

Each complex prepared in Examples and Comparative Examples was compressed with hot-press under conditions of 150° C. and 5 minutes to prepare a 65*70*2 mm (width*length*thickness) specimen for measuring electric resistance, and the following properties of the specimen were measured.
(1) Tensile strength and elongation at break: measured according to ASTM D638
(2) Electric resistance: Copper tapes were attached to both ends of the specimen and voltage of 1V was applied with Agilent LCR meter, and electric resistance was measured.
(3) Shore D hardness: measured according to ASTM D2240

The results were shown in the following Table 1.

TABLE 1

| Unit | Content of carbon nanotubes[1] parts by weight | Tensile strength MPa | Elongation at break % | Electric resistance Ω | Shore D hardness — |
|---|---|---|---|---|---|
| Example 1 | 5 | 28 | 280 | 570,000 | 34 |
| Example 2 | 15 | 20 | 250 | <1,000 | 35 |
| Comparative Example 1 | 0 | 25 | 380 | >300,000,000 | 29 |
| Comparative Example 2 | 5 | 17 | 210 | 7,000,000 | 31 |

[1]the content of carbon nanotubes, based on 100 parts by weight of PBAT

As shown in Table 1, it can be confirmed that the complexes of Examples according to the invention exhibit remarkably lowered electric resistance, compared to the case without carbon nanotubes (Comparative Example 1), or the case wherein carbon nanotubes are dispersed in molten PBAT (Comparative Example 2). Thus, it can be confirmed that in case a complex is prepared by the preparation method according to the invention, carbon nanotubes are more uniformly dispersed in PBAT.

Further, it can be confirmed that the complexes of Examples according to the invention also exhibit improved mechanical strength, compared to the case wherein carbon nanotubes are dispersed in molten PBAT (Comparative Example 2), which results from more uniform dispersion of carbon nanotubes in PBAT when preparing a complex by the preparation method according to the invention.

The invention claimed is:

1. A method for preparing poly(butylene adipate-co-terephthalate)-carbon nanotube complex, comprising steps of:
   1) adding poly(butylene adipate-co-terephthalate) and carbon nanotubes to chloroform and mixing them;
   2) adding acetone to the mixture of step 1 and mixing them; and
   3) recovering a precipitate from the product of step 2.

2. The method according to claim 1, wherein
in step 1, the addition of poly(butylene adipate-co-terephthalate) is such that the concentration of poly(butylene adipate-co-terephthalate) in the chloroform is 0.01 to 20 mg/mL.

3. The method according to claim 1, wherein
in step 1, the carbon nanotubes are added in an amount of 0.1 to 20 parts by weight, based on 100 parts by weight of the poly(butylene adipate-co-terephthalate).

4. The method according to claim 1, wherein
the carbon nanotubes are single walled carbon nanotubes, or multiwalled carbon nanotubes.

5. The method according to claim 1, wherein
the mixing of step 1 is conducted for 1 to 48 hours.

6. The method according to claim 1, wherein
in step 2, acetone is added in an amount 1 to 30 volume %, based on the chloroform.

7. The method according to claim 1, wherein
the mixing of step 2 is conducted by stirring, after adding acetone dropwise to the mixture of step 1.

8. The method according to claim 1, wherein
in step 3, the product of step 2 is filtered and the precipitate is recovered.

9. The method according to claim 1, further comprising a step of drying the precipitate recovered in the step 3.

* * * * *